US 11,454,108 B2

(12) United States Patent
Alelaiwy et al.

(10) Patent No.: US 11,454,108 B2
(45) Date of Patent: Sep. 27, 2022

(54) WELLHEAD GROWTH MONITORING SYSTEM

(71) Applicant: Saudi Arabian Oil Company, Dhahran (SA)

(72) Inventors: Mishaal Abdulrahman Alelaiwy, Dhahran (SA); Mutlaq Saad Alotaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 163 days.

(21) Appl. No.: 17/064,459

(22) Filed: Oct. 6, 2020

(65) Prior Publication Data

US 2022/0106870 A1    Apr. 7, 2022

(51) Int. Cl.
| | |
|---|---|
| *G01V 1/52* | (2006.01) |
| *E21B 47/08* | (2012.01) |
| *G08B 21/18* | (2006.01) |
| *G01V 1/30* | (2006.01) |
| *G01V 8/00* | (2006.01) |

(52) U.S. Cl.
CPC .............. *E21B 47/08* (2013.01); *G01V 1/52* (2013.01); *G08B 21/182* (2013.01); *G01V 1/306* (2013.01); *G01V 8/00* (2013.01); *G01V 2001/526* (2013.01)

(58) Field of Classification Search
CPC .......... E21B 47/08; G01V 1/52; G08B 21/182
See application file for complete search history.

(56) References Cited

U.S. PATENT DOCUMENTS

| | | | | |
|---|---|---|---|---|
| 3,577,773 | A  * | 5/1971 | Kubo | G01B 7/046 73/624 |
| 7,274,989 | B2 * | 9/2007 | Hopper | E21B 47/00 702/6 |
| 7,980,305 | B2 * | 7/2011 | Judge | E21B 33/061 251/1.3 |
| 9,528,364 | B2 * | 12/2016 | Samuel | E21B 47/00 |

(Continued)

OTHER PUBLICATIONS

Gao, Bao-kui et al. "Study on Wellhead Growth in Deep Well." (2016). DOI:10.1051/MATECCONF/20167706003 (Year: 2016).*

(Continued)

*Primary Examiner* — Ian J Lobo
(74) *Attorney, Agent, or Firm* — Fish & Richardson P.C.

(57) ABSTRACT

Systems and methods include a computer-implemented method: Real-time measurements are received by a wellhead growth monitoring computer system from a sensor on a wellhead of a well. The sensor is directed to a fixed point on a platform grating that is facing or underneath the wellhead. The real-time measurements, including measurements of a distance from the sensor to the fixed point, are analyzed by the wellhead growth monitoring computer system, including comparing the real-time measurements to previously-received measurements from the sensor. A determination is made, by the wellhead growth monitoring computer system based on the analyzing, that wellhead growth of a wellhead structure of the well has occurred. The wellhead growth is a vertical elongation of the wellhead structure. A notification that is provided to a user includes a measure of the wellhead growth and a time at which the wellhead growth occurred.

20 Claims, 3 Drawing Sheets

(56) References Cited

U.S. PATENT DOCUMENTS

2018/0096083 A1 4/2018 Kang et al.
2020/0024926 A1 1/2020 Reinas et al.

OTHER PUBLICATIONS

Zhang et al., "Study of a model of wellhead growth in offshore oil and gas wells", Journal of Petroleum Science and Engineering, vol. 158 (2017) pp. 144-151 (Year: 2017).*

Qiao et al., "Analysis of the wellhead growth in HPHT gas wells considering the multiple annuli pressure during production." Journal of Natural Gas Science and Engineering 50, Feb. 2018, 43-54, 12 pages.

Smith et al., "The Total Control of Well Integrity Management." Abu Dhabi International Petroleum Exhibition and Conference. OnePetro, Nov. 2008, 9 pages.

PCT International Search Report and Written Opinion in International Appln. No. PCT/US2021/053698, dated Jan. 27, 2022, 16 pages.

* cited by examiner

WELLHEAD GROWTH MONITORING SYSTEM

BACKGROUND

The present disclosure applies to monitoring systems used in the petroleum industry, such as gas operations, including offshore gas wells.

Wellhead growth is a process by which the physical structure of a well elongates due to high temperatures exerted on the structure from the produced hydrocarbons. Conventional systems typically are deficient in wellhead growth detection because measurements that are taken manually cannot be used to determine when growth has actually occurred. As a result, operators may not know exactly when wellhead growth occur unless a visit to the platform is conducted. By that time, undetected wellhead growth may have already damaged the structure without being known by personnel.

SUMMARY

The present disclosure describes techniques that can be used for monitoring wellhead growth. In some implementations, a computer-implemented method includes the following. Real-time measurements are received by a wellhead growth monitoring computer system from a sensor on a wellhead of a well. The sensor is directed to a fixed point on a platform grating facing or underneath the wellhead. The real-time measurements include measurements of a distance from the sensor to the fixed point. The real-time measurements are analyzed by the wellhead growth monitoring computer system, including comparing the real-time measurements to previously-received measurements from the sensor. A determination is made, by the wellhead growth monitoring computer system based on the analyzing, that wellhead growth of a wellhead structure of the well has occurred. The wellhead growth is a vertical elongation of the wellhead structure. A notification is provided to a user by the wellhead growth monitoring computer system. The notification includes a measure of the wellhead growth and a time at which the wellhead growth occurred.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, real-time monitoring can be enabled on measurements that are collected regularly, such as quarterly. In this way, data collection can be integrated into workflows and decision-making processes that are proactive rather than simply reactive. This can allow a user (operator or engineer) to be notified when a well is growing, allowing the user to take immediate action before the situation becomes significantly more likely to be harmful to the wellhead. Second, a displacement monitoring system can be installed that indicates whether the wellhead is growing or not. Third, measurements can be received in real time and can correspond to wellhead growth monitoring that occurs without the need to visit the platform. The term real-time can correspond, for example, to events that occur within a specified period of time, such as within minutes, hours, or days. Fourth, wellhead growth monitoring can be integrated in Fourth Industrial Revolution (IR 4.0) strategies that are implemented by a company. Fifth, the displacement monitoring system can eliminate aspects of human error associated with taking measurements and interpreting results. Sixth, the displacement monitoring system can add an extra layer of protection for company assets, for example, gas wells.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for automatically monitoring wellhead growth. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure can enable the collection of wellhead growth measurements to be used in a proactive wellhead growth monitoring system. This can provide an advantage over conventional systems, for example, that are typically reactive. For example, the techniques can enable an operator or an engineer to make decisions prior to the occurrence of well damage that may occur to surface facilities due to wellhead growth that as gone unnoticed.

Figure 1:
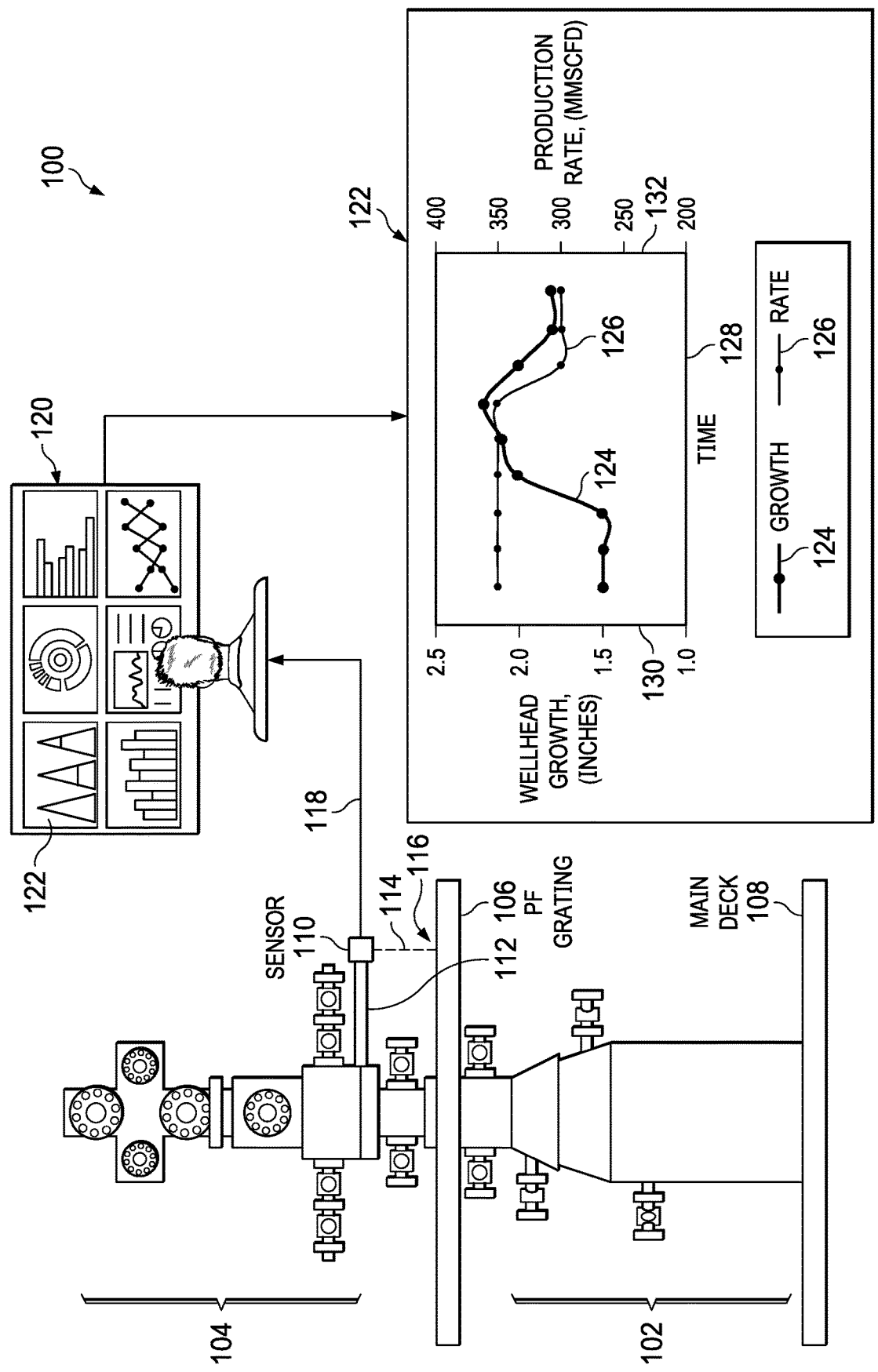
FIG. 1 is a block diagram showing an example of a wellhead growth monitoring system, according to some implementations of the present disclosure.

FIG. 1 is a block diagram showing an example of a wellhead growth monitoring system 100, according to some implementations of the present disclosure. Wellhead growth can be monitored in a wellhead structure 102 that supports a wellhead 104. Wellhead growth can occur, for example, if the wellhead structure 102 elongates vertically (or moves upward) due to thermal expansion. For example, the thermal expansion can be caused by heat that is generated by fluids or hydrocarbons that are produced from the reservoir. Heated fluids, such as including hydrocarbons, can cause an expansion of the tubulars and casings, which in turn can cause an upward movement of the wellhead structure 102.

Wellhead growth can be determined from measurements that are taken with respect to a fixed point. For example, measurements can be taken at a platform (PF) grating 106 above the wellhead structure 102 and above a main deck 108. In some implementations, wellhead growth can be determined to have occurred (and an alarm can be triggered, for example) when a difference in measurements is above a threshold (for example 2 millimeters). Information associated with the wellhead growth can displayed, for example, in a graphical user interface (GUI) presented on location and in a control room.

Measurements in conventional systems are typically taken manually using a measuring tape. Using techniques of the present disclosure, real-time readings can be captured automatically by a sensor 110, eliminating the need to take, record, and compare manual measurements. The term real-time can correspond, for example, to events that occur within a specified period of time, such as within minutes, hours, or days.

The sensor 110 can be a displacement measuring device, such as a laser/ultra-sonic device, that is mounted on a mount 112 perpendicular to a Christmas tree arrangement on the wellhead 104. The sensor 110 can point downwards, for example, emitting along a line-of-site 114, to a fixed point 116 on the PF grating 106. The sensor 110 can transmit one or both of voltage and current output to a Remote Transmitting Unit (RTU). The RTU can transmit this data to a control room in the plant and enable real-time monitoring on wellhead growth. For example, the control room can receive sensor information 118 that is transmitted to one or more computers 120 in the control room. In some implementations, computers that receive the sensor information 118 can include local and remote computers.

Computers 120 can display a graphical user interface (GUI) 122 that includes wellhead growth monitoring information and may also include other displays and dashboards used by the operators of the well. The GUI 122 can display trending data that shows relationships over time between, for example, wellhead growth 124 and other wellhead parameters (such as a well production rate 126). The relationships can be shown in graphical form (as shown in FIG. 1), in tabular form, or both.

Trending graphs, such as shown in the GUI 122, can be plotted relative to a common time axis 128. In this example, a wellhead growth axis 130 (for example, in inches) is the axis that corresponds to the wellhead growth 124. A production rate axis 132 (for example, in millions of standard cubic feet per day (MMSCFD)) is the axis that corresponds to the well production rate 126.

Figure 2:
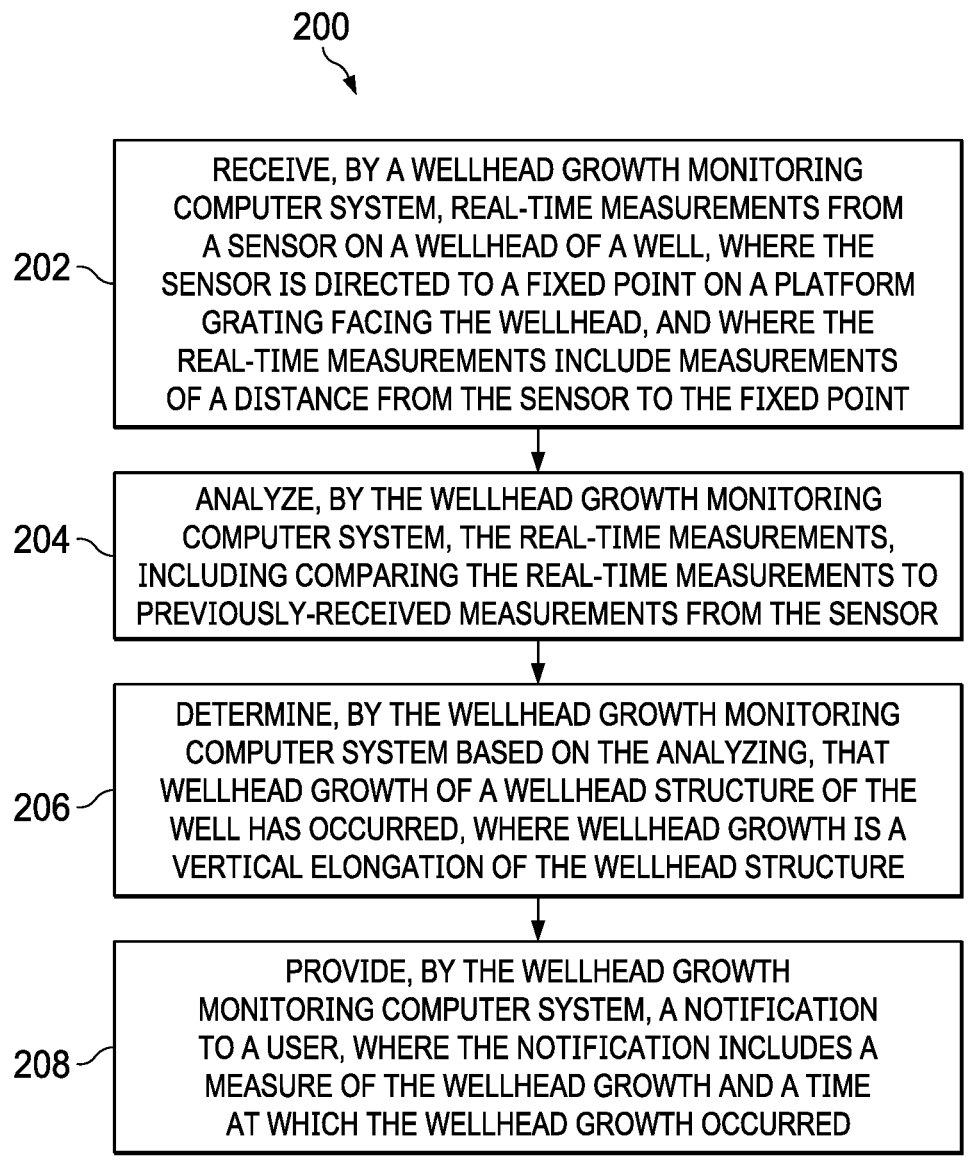
FIG. 2 is a flowchart of an example of a method for automatically monitoring wellhead growth, according to some implementations of the present disclosure.

FIG. 2 is a flowchart of an example of a method 200 for automatically monitoring wellhead growth, according to some implementations of the present disclosure. For clarity of presentation, the description that follows generally describes method 200 in the context of the other figures in this description. However, it will be understood that method 200 can be performed, for example, by any suitable system, environment, software, and hardware, or a combination of systems, environments, software, and hardware, as appropriate. In some implementations, various steps of method 200 can be run in parallel, in combination, in loops, or in any order.

At 202, real-time measurements from a sensor on a wellhead of a well are received by a wellhead growth monitoring computer system. The sensor is directed to a fixed point on a platform grating facing (for example, under) the wellhead. The real-time measurements include measurements of a distance from the sensor to the fixed point. As an example, the wellhead growth monitoring computer system can include the sensor 110, the fixed point 116, the one or more computers 120, and network communications that allow the components to work together to automatically monitor the well. The wellhead growth monitoring computer system can serve as a displacement monitoring system. The wellhead can be on a well of a petroleum facility, such as an offshore gas well. The sensor can include one or both of a laser and an ultra-sonic device. In some implementations, more than one sensor can be used, each sensor with its own fixed point or shared fixed points. In some implementations, different configurations of sensors and fixed points can be used, including one or more sensors mounted on the platform and pointed upward or towards the fixed point(s). From 202, method 200 proceeds to 204.

At 204, the real-time measurements are analyzed by the wellhead growth monitoring computer system, including comparing the real-time measurements to previously-received measurements from the sensor. For example, the wellhead growth monitoring computer system can store measurements that are received over time for comparison with new measurements. From 204, method 200 proceeds to 206.

At 206, based on the analyzing, a determination is made by the wellhead growth monitoring computer system that wellhead growth of a wellhead structure of the well has occurred, where wellhead growth is a vertical elongation of the wellhead structure. For example, determining that wellhead growth of the wellhead structure of the well has occurred can include determining that the distance from the sensor to the fixed point has increased by more than a threshold amount. From 206, method 200 proceeds to 208.

At 208, a notification provided by the wellhead growth monitoring computer system is presented to a user. The notification includes a measure of the wellhead growth and a time at which the wellhead growth occurred. In some implementations, providing the notification to the user can include providing a GUI (for example, the GUI 122) that displays information regarding the wellhead growth. For example, the GUI can display information regarding the wellhead growth including providing a graph displaying the wellhead growth in comparison to at least one well parameter. The graph can include, for example, the wellhead growth 124 and other wellhead parameters (such as a well production rate 126). In some implementations, notifications that indicate that wellhead growth has occurred can be sent as a prioritized message that appears in the GUI or is sent in other ways. After 208, method 200 can stop.

In some implementations, improvements can be implemented in order to identify and mitigate false readings that may occur when a foreign object (for example, a bird or blowing piece plastic or paper debris) passes through the emitting line for the sensor. For example, a motion sensor can be added in proximity to the sensor 110 in order to detect foreign objects.

Figure 3:
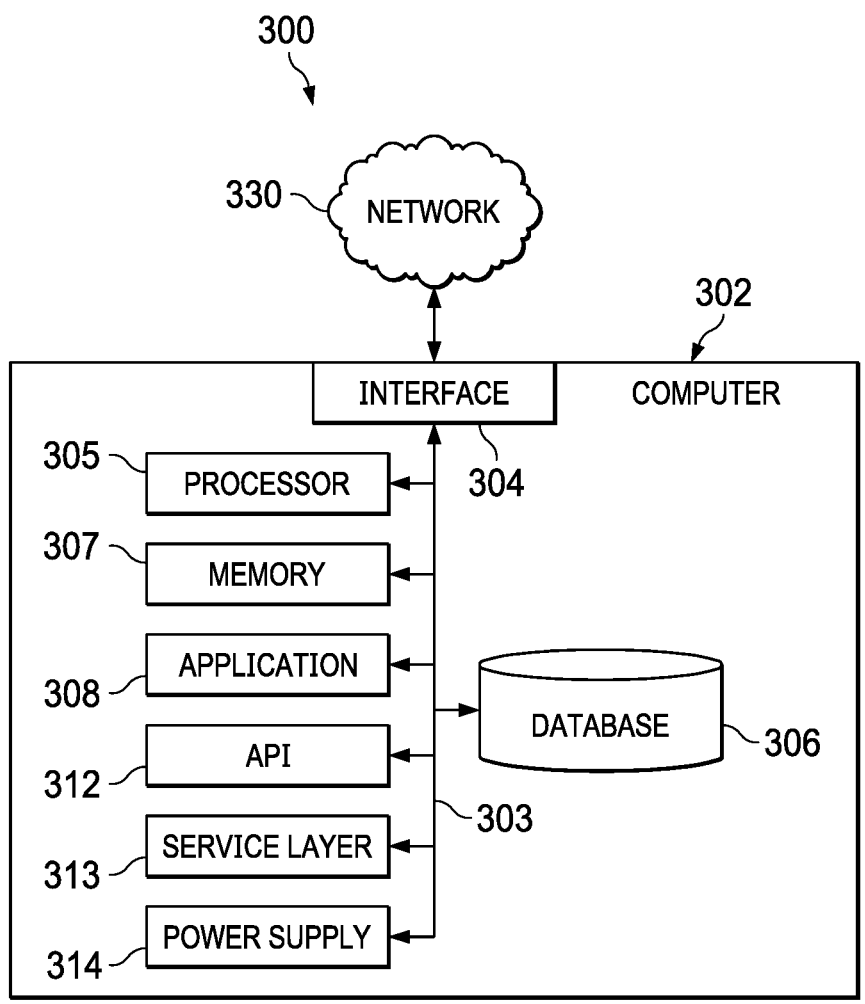
FIG. 3 is a block diagram illustrating an example computer system used to provide computational functionalities associated with described algorithms, methods, functions, processes, flows, and procedures as described in the present disclosure, according to some implementations of the present disclosure.

FIG. 3 is a block diagram of an example computer system 300 used to provide computational functionalities associated with described algorithms, methods, functions, processes, flows, and procedures described in the present disclosure, according to some implementations of the present disclosure. The illustrated computer 302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 302 can include input devices such as keypads, keyboards, and touch screens that can accept user information. Also, the computer 302 can include output devices that can convey information associated with the operation of the computer 302. The information can include digital data, visual data, audio information, or a combination of information. The information can be presented in a graphical user interface (UI) (or GUI).

The computer 302 can serve in a role as a client, a network component, a server, a database, a persistency, or components of a computer system for performing the subject matter described in the present disclosure. The illustrated computer 302 is communicably coupled with a network 330. In some implementations, one or more components of the computer 302 can be configured to operate within different environments, including cloud-computing-based environments, local environments, global environments, and combinations of environments.

At a top level, the computer 302 is an electronic computing device operable to receive, transmit, process, store, and manage data and information associated with the described subject matter. According to some implementations, the computer 302 can also include, or be communicably coupled with, an application server, an email server, a web server, a caching server, a streaming data server, or a combination of servers.

The computer 302 can receive requests over network 330 from a client application (for example, executing on another computer 302). The computer 302 can respond to the received requests by processing the received requests using software applications. Requests can also be sent to the computer 302 from internal users (for example, from a command console), external (or third) parties, automated applications, entities, individuals, systems, and computers.

Each of the components of the computer 302 can communicate using a system bus 303. In some implementations, any or all of the components of the computer 302, including hardware or software components, can interface with each other or the interface 304 (or a combination of both) over the system bus 303. Interfaces can use an application programming interface (API) 312, a service layer 313, or a combination of the API 312 and service layer 313. The API 312 can include specifications for routines, data structures, and object classes. The API 312 can be either computer-language independent or dependent. The API 312 can refer to a complete interface, a single function, or a set of APIs.

The service layer 313 can provide software services to the computer 302 and other components (whether illustrated or not) that are communicably coupled to the computer 302. The functionality of the computer 302 can be accessible for all service consumers using this service layer. Software services, such as those provided by the service layer 313, can provide reusable, defined functionalities through a defined interface. For example, the interface can be software written in JAVA, C++, or a language providing data in extensible markup language (XML) format. While illustrated as an integrated component of the computer 302, in alternative implementations, the API 312 or the service layer 313 can be stand-alone components in relation to other components of the computer 302 and other components communicably coupled to the computer 302. Moreover, any or all parts of the API 312 or the service layer 313 can be implemented as child or sub-modules of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302 and the described functionality. The interface 304 can be used by the computer 302 for communicating with other systems that are connected to the network 330 (whether illustrated or not) in a distributed environment. Generally, the interface 304 can include, or be implemented using, logic encoded in software or hardware (or a combination of software and hardware) operable to communicate with the network 330. More specifically, the interface 304 can include software supporting one or more communication protocols associated with communications. As such, the network 330 or the interface's hardware can be operable to communicate physical signals within and outside of the illustrated computer 302.

The computer 302 includes a processor 305. Although illustrated as a single processor 305 in FIG. 3, two or more processors 305 can be used according to particular needs, desires, or particular implementations of the computer 302 and the described functionality. Generally, the processor 305 can execute instructions and can manipulate data to perform the operations of the computer 302, including operations using algorithms, methods, functions, processes, flows, and procedures as described in the present disclosure.

The computer 302 also includes a database 306 that can hold data for the computer 302 and other components connected to the network 330 (whether illustrated or not). For example, database 306 can be an in-memory, conventional, or a database storing data consistent with the present disclosure. In some implementations, database 306 can be a combination of two or more different database types (for example, hybrid in-memory and conventional databases) according to particular needs, desires, or particular implementations of the computer 302 and the described functionality. Although illustrated as a single database 306 in FIG. 3, two or more databases (of the same, different, or combination of types) can be used according to particular needs, desires, or particular implementations of the computer 302 and the described functionality. While database 306 is illustrated as an internal component of the computer 302, in alternative implementations, database 306 can be external to the computer 302.

The computer 302 also includes a memory 307 that can hold data for the computer 302 or a combination of components connected to the network 330 (whether illustrated or not). Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same, different, or combination of types) can be used according to particular needs, desires, or particular implementations of the computer 302 and the described functionality. While memory 307 is illustrated as an internal component of the computer 302, in alternative implementations, memory 307 can be external to the computer 302.

The application 308 can be an algorithmic software engine providing functionality according to particular needs, desires, or particular implementations of the computer 302 and the described functionality. For example, application

308 can serve as one or more components, modules, or applications. Further, although illustrated as a single application 308, the application 308 can be implemented as multiple applications 308 on the computer 302. In addition, although illustrated as internal to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion and management circuits, including recharging, standby, and power management functionalities. In some implementations, the power-supply 314 can include a power plug to allow the computer 302 to be plugged into a wall socket or a power source to, for example, power the computer 302 or recharge a rechargeable battery.

There can be any number of computers 302 associated with, or external to, a computer system containing computer 302, with each computer 302 communicating over network 330. Further, the terms "client," "user," and other appropriate terminology can be used interchangeably, as appropriate, without departing from the scope of the present disclosure. Moreover, the present disclosure contemplates that many users can use one computer 302 and one user can use multiple computers 302.

Described implementations of the subject matter can include one or more features, alone or in combination.

For example, in a first implementation, a computer-implemented method includes the following. Real-time measurements are received by a wellhead growth monitoring computer system from a sensor on a wellhead of a well. The sensor is directed to a fixed point on a platform grating facing or underneath the wellhead. The real-time measurements include measurements of a distance from the sensor to the fixed point. The real-time measurements are analyzed by the wellhead growth monitoring computer system, including comparing the real-time measurements to previously-received measurements from the sensor. A determination is made, by the wellhead growth monitoring computer system based on the analyzing, that wellhead growth of a wellhead structure of the well has occurred. The wellhead growth is a vertical elongation of the wellhead structure. A notification is provided to a user by the wellhead growth monitoring computer system. The notification includes a measure of the wellhead growth and a time at which the wellhead growth occurred.

The foregoing and other described implementations can each, optionally, include one or more of the following features:

A first feature, combinable with any of the following features, where determining that wellhead growth of the wellhead structure of the well has occurred includes determining that the distance from the sensor to the fixed point has increased by more than a threshold amount.

A second feature, combinable with any of the previous or following features, where the wellhead is on a well of a petroleum facility, and where the petroleum facility is an offshore gas well or an onshore gas well.

A third feature, combinable with any of the previous or following features, where the sensor includes one or both of a laser and an ultra-sonic device.

A fourth feature, combinable with any of the previous or following features, where the real-time measurements are received by a Remote Transmitting Unit (RTU) and sent to a computer in a control room in a facility controlling the well.

A fifth feature, combinable with any of the previous or following features, where providing the notification to the user includes providing a graphical user interface (GUI) that displays information regarding the wellhead growth.

A sixth feature, combinable with any of the previous or following features, where providing the GUI that displays information regarding the wellhead growth includes providing a graph displaying the wellhead growth in comparison to at least one well parameter.

In a second implementation, a non-transitory, computer-readable medium stores one or more instructions executable by a computer system to perform operations including the following. Real-time measurements are received by a wellhead growth monitoring computer system from a sensor on a wellhead of a well. The sensor is directed to a fixed point on a platform grating facing or underneath the wellhead. The real-time measurements include measurements of a distance from the sensor to the fixed point. The real-time measurements are analyzed by the wellhead growth monitoring computer system, including comparing the real-time measurements to previously-received measurements from the sensor. A determination is made, by the wellhead growth monitoring computer system based on the analyzing, that wellhead growth of a wellhead structure of the well has occurred. The wellhead growth is a vertical elongation of the wellhead structure. A notification is provided to a user by the wellhead growth monitoring computer system. The notification includes a measure of the wellhead growth and a time at which the wellhead growth occurred.

The foregoing and other described implementations can each, optionally, include one or more of the following features:

A first feature, combinable with any of the following features, where determining that wellhead growth of the wellhead structure of the well has occurred includes determining that the distance from the sensor to the fixed point has increased by more than a threshold amount.

A second feature, combinable with any of the previous or following features, where the wellhead is on a well of a petroleum facility, and where the petroleum facility is an offshore gas well or an onshore gas well.

A third feature, combinable with any of the previous or following features, where the sensor includes one or both of a laser and an ultra-sonic device.

A fourth feature, combinable with any of the previous or following features, where the real-time measurements are received by a Remote Transmitting Unit (RTU) and sent to a computer in a control room in a facility controlling the well.

A fifth feature, combinable with any of the previous or following features, where providing the notification to the user includes providing a graphical user interface (GUI) that displays information regarding the wellhead growth.

A sixth feature, combinable with any of the previous or following features, where providing the GUI that displays information regarding the wellhead growth includes providing a graph displaying the wellhead growth in comparison to at least one well parameter.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Real-time measurements are received by a wellhead growth monitoring computer system from a sensor on a wellhead of a well. The sensor is directed to a fixed point on a platform grating facing or underneath the wellhead. The real-time measurements include measurements of a distance from the sensor to the fixed point. The real-time measurements are analyzed by the wellhead growth monitoring computer system, including comparing the real-time measurements to previously-received measurements from the sensor. A determination is made, by the wellhead growth monitoring computer system based on the analyzing, that wellhead growth of a wellhead structure of the well has occurred. The wellhead growth is a vertical elongation of the wellhead structure. A notification is provided to a user by the wellhead growth monitoring computer system. The notification includes a measure of the wellhead growth and a time at which the wellhead growth occurred.

The foregoing and other described implementations can each, optionally, include one or more of the following features:

A first feature, combinable with any of the following features, where determining that wellhead growth of the wellhead structure of the well has occurred includes determining that the distance from the sensor to the fixed point has increased by more than a threshold amount.

A second feature, combinable with any of the previous or following features, where the wellhead is on a well of a petroleum facility, and where the petroleum facility is an offshore gas well or an onshore gas well.

A third feature, combinable with any of the previous or following features, where the sensor includes one or both of a laser and an ultra-sonic device.

A fourth feature, combinable with any of the previous or following features, where the real-time measurements are received by a Remote Transmitting Unit (RTU) and sent to a computer in a control room in a facility controlling the well.

A fifth feature, combinable with any of the previous or following features, where providing the notification to the user includes providing a graphical user interface (GUI) that displays information regarding the wellhead growth.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving, by a wellhead growth monitoring computer system, real-time measurements from a sensor on a wellhead of a well, wherein the sensor is directed to a fixed point on a platform grating facing the wellhead, and wherein the real-time measurements include measurements of a distance from the sensor to the fixed point;
analyzing, by the wellhead growth monitoring computer system, the real-time measurements, including comparing the real-time measurements to previously-received measurements from the sensor;
determining, by the wellhead growth monitoring computer system based on the analyzing, that wellhead growth of a wellhead structure of the well has occurred, wherein wellhead growth is a vertical elongation of the wellhead structure; and
providing, by the wellhead growth monitoring computer system, a notification to a user, wherein the notification includes a measure of the wellhead growth and a time at which the wellhead growth occurred.

2. The computer-implemented method of claim 1, wherein determining that wellhead growth of the wellhead structure of the well has occurred includes determining that the distance from the sensor to the fixed point has increased by more than a threshold amount.

3. The computer-implemented method of claim 1, wherein the wellhead is on a well of a petroleum facility, and wherein the petroleum facility is an offshore gas well or an onshore gas well.

4. The computer-implemented method of claim 1, wherein the sensor includes one or both of a laser and an ultra-sonic device.

5. The computer-implemented method of claim 1, wherein the real-time measurements are received by a Remote Transmitting Unit (RTU) and sent to a computer in a control room in a facility controlling the well.

6. The computer-implemented method of claim 1, wherein providing the notification to the user includes providing a graphical user interface (GUI) that displays information regarding the wellhead growth.

7. The computer-implemented method of claim 6, wherein providing the GUI that displays information regarding the wellhead growth includes providing a graph displaying the wellhead growth in comparison to at least one well parameter.

8. A non-transitory, computer-readable medium storing one or more instructions executable by a computer system to perform operations comprising:
receiving, by a wellhead growth monitoring computer system, real-time measurements from a sensor on a wellhead of a well, wherein the sensor is directed to a fixed point on a platform grating facing the wellhead, and wherein the real-time measurements include measurements of a distance from the sensor to the fixed point;
analyzing, by the wellhead growth monitoring computer system, the real-time measurements, including comparing the real-time measurements to previously-received measurements from the sensor;
determining, by the wellhead growth monitoring computer system based on the analyzing, that wellhead growth of a wellhead structure of the well has occurred, wherein wellhead growth is a vertical elongation of the wellhead structure; and
providing, by the wellhead growth monitoring computer system, a notification to a user, wherein the notification includes a measure of the wellhead growth and a time at which the wellhead growth occurred.

9. The non-transitory, computer-readable medium of claim 8, wherein determining that wellhead growth of the wellhead structure of the well has occurred includes determining that the distance from the sensor to the fixed point has increased by more than a threshold amount.

10. The non-transitory, computer-readable medium of claim 8, wherein the wellhead is on a well of a petroleum facility, and wherein the petroleum facility is an offshore gas well or an onshore gas well.

11. The non-transitory, computer-readable medium of claim 8, wherein the sensor includes one or both of a laser and an ultra-sonic device.

12. The non-transitory, computer-readable medium of claim 8, wherein the real-time measurements are received by a Remote Transmitting Unit (RTU) and sent to a computer in a control room in a facility controlling the well.

13. The non-transitory, computer-readable medium of claim 8, wherein providing the notification to the user includes providing a graphical user interface (GUI) that displays information regarding the wellhead growth.

14. The non-transitory, computer-readable medium of claim 13, wherein providing the GUI that displays information regarding the wellhead growth includes providing a graph displaying the wellhead growth in comparison to at least one well parameter.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving, by a wellhead growth monitoring computer system, real-time measurements from a sensor on a wellhead of a well, wherein the sensor is directed to a fixed point on a platform grating facing the wellhead, and wherein the real-time measurements include measurements of a distance from the sensor to the fixed point;
analyzing, by the wellhead growth monitoring computer system, the real-time measurements, including comparing the real-time measurements to previously-received measurements from the sensor;
determining, by the wellhead growth monitoring computer system based on the analyzing, that wellhead growth of a wellhead structure of the well has occurred, wherein wellhead growth is a vertical elongation of the wellhead structure; and
providing, by the wellhead growth monitoring computer system, a notification to a user, wherein the notification includes a measure of the wellhead growth and a time at which the wellhead growth occurred.

16. The computer-implemented system of claim 15, wherein determining that wellhead growth of the wellhead structure of the well has occurred includes determining that the distance from the sensor to the fixed point has increased by more than a threshold amount.

17. The computer-implemented system of claim 15, wherein the wellhead is on a well of a petroleum facility, and wherein the petroleum facility is an offshore gas well or an onshore gas well.

18. The computer-implemented system of claim 15, wherein the sensor includes one or both of a laser and an ultra-sonic device.

19. The computer-implemented system of claim 15, wherein the real-time measurements are received by a Remote Transmitting Unit (RTU) and sent to a computer in a control room in a facility controlling the well.

20. The computer-implemented system of claim 15, wherein providing the notification to the user includes providing a graphical user interface (GUI) that displays information regarding the wellhead growth.

* * * * *